United States Patent
Taherzadeh Boroujeni et al.

(10) Patent No.: US 11,792,861 B2
(45) Date of Patent: Oct. 17, 2023

(54) BEAM SPECIFIC RACH OCCASION DENSITY

(71) Applicant: QUALCOMM Incorporated, San Diego, CA (US)

(72) Inventors: Mahmoud Taherzadeh Boroujeni, San Diego, CA (US); Tao Luo, San Diego, CA (US); Iyab Issam Sakhnini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 17/494,327

(22) Filed: Oct. 5, 2021

(65) Prior Publication Data

US 2022/0110167 A1    Apr. 7, 2022

Related U.S. Application Data

(60) Provisional application No. 63/088,121, filed on Oct. 6, 2020.

(51) Int. Cl.
*H04W 74/08*     (2009.01)
*H04W 72/0446*   (2023.01)
(Continued)

(52) U.S. Cl.
CPC ..... *H04W 74/0841* (2013.01); *H04W 72/046* (2013.01); *H04W 72/0446* (2013.01); *H04W 72/0453* (2013.01); *H04W 74/0891* (2013.01)

(58) Field of Classification Search
CPC ......... H04W 74/0841; H04W 72/0446; H04W 72/0453; H04W 74/0891; H04W 72/046;
(Continued)

(56) References Cited

U.S. PATENT DOCUMENTS

2019/0387546 A1* 12/2019 Li ............... H04L 27/26132
2022/0110161 A1*  4/2022 Christoffersson ............
                                        H04W 74/0833

FOREIGN PATENT DOCUMENTS

EP    4021106 A1 *  6/2022  .......... H04W 74/004

OTHER PUBLICATIONS

Ericsson: "Procedure for Two-Step RACH", 3GPP Draft, R1-1912672, 3GPP TSG-RAN WG1 Meeting #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823524, pp. 1-12, Retrieved from the Internet: URL:https://ftp.3gpp.org/tsg_ran/WG1_RL1/TSGR1_99/Docs/R1-1912672.zip R1-1912672 Procedure for Two-step RACH.docx [retrieved on Nov. 9, 2019] paragraph [02.1].
(Continued)

*Primary Examiner* — Thai Nguyen
(74) *Attorney, Agent, or Firm* — Sevan Savsa; ArentFox Schiff LLP

(57) ABSTRACT

Aspects of the present disclosure provide techniques for adjusting the density and/or number of random access channel (RACH) occasion for one or subset of synchronization signal block (SSB) beams from the plurality of available SSB beams. To this end, features of the present disclosure utilize a beam-specific bit-field that is transmitted by the base station to the user equipment (UE) that may indicate RACH occasion density for a SSB beam or a subset of SSB beams. In some aspects, the time and frequency resources for RACH occasion with beam-specific alternative density may be identified via the resources for general RACH occasions. Based on the adjusted RACH occasion density, the UE may select one or time and frequency resources to initiate access with the base station.

20 Claims, 6 Drawing Sheets

(51) Int. Cl.
*H04W 72/0453* (2023.01)
*H04W 72/044* (2023.01)

(58) Field of Classification Search
CPC ............. H04W 74/0833; H04W 16/28; H04W 74/002; H04W 74/0808; H04W 72/23; H04B 7/0695
See application file for complete search history.

(56) References Cited

OTHER PUBLICATIONS

International Search Report and Written Opinion—PCT/US2021/053728—ISA/EPO—dated Feb. 1, 2022.
LG Electronics: "RACH Procedure", 3GPP Draft, R1-1800355, 3GPP TSG RAN WG1 Meeting AH 1801, RACH Procedure, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018 (Jan. 13, 2018), XP051384810, 4 Pages, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018] paragraph [0002].
Samsung: "Channel Structure for Two-Step RACH", 3GPP Draft, R1-1912443, 3GPP TSG RAN WG1 Meeting #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019 (Nov. 8, 2019), XP051820033, 11 Pages, URL:https://ftp.3gpp.org/tsg_ran/WG1_RL1/TSGR1_99/Docs/R1-1912443.zip R1-1912443_Channel Struct. for Two-Step RACH.DOCX [retrieved on Nov. 8, 2019] para [02.1] proposal 2, proposal 3.

* cited by examiner

BEAM SPECIFIC RACH OCCASION DENSITY

CROSS-REFERENCE TO RELATED APPLICATION(S)

The present application claims benefit of U.S. Provisional Application No. 63/088,121 entitled "BEAM SPECIFIC RACH OCCASION DENSITY" filed Oct. 6, 2020, which is assigned to the assignee hereof and hereby expressly incorporated by reference herein.

TECHNICAL FIELD

The present disclosure relates to wireless communication systems, and more particularly, to techniques for adjusting the density and/or number of random access channel (RACH) occasion for one or subset of synchronization signal block (SSB) beams from the plurality of available SSB beams in order to accommodate overloading and/or congestion.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

SUMMARY

Aspects of the present disclosure provide techniques for adjusting the density and/or number of random access channel (RACH) occasion for one or subset of synchronization signal block (SSB) beams from the plurality of available SSB beams. To this end, features of the present disclosure utilize a beam-specific bit-field that is transmitted by the base station to the user equipment (UE) that may indicate RACH occasion density for a SSB beam or a subset of SSB beams. In some aspects, the time and frequency resources for RACH occasion with beam-specific alternative density may be identified via the resources for general RACH occasions. Based on the adjusted RACH occasion density, the UE may select one or time and frequency resources to initiate access with the base station.

In one example, a method, apparatus, and non-transitory computer readable medium for wireless communication implemented by a base station is disclosed. The method may include configuring, at a base station, a first set of synchronization signal block (SSB) beams from a plurality of SSB beams with a first set of random access channel (RACH) occasion density, wherein the RACH occasion density identifies time and frequency resources that one or more user equipments (UEs) can utilize to transmit initial access requests to the base station. The method may further include configuring a second set of SSB beams from the plurality of SSB beams with a second set of RACH occasion density. In some examples, the first set of RACH occasion density may be greater than the second set of RACH occasion density for the second set of SSB beams. The method may further include transmitting a system information message to the one or more UEs that includes a beam-specific bit-field indicate the first set of RACH occasion density for the first set of SSB beams and the second set of RACH occasion density for the second set of SSB beams.

In one example, a method, apparatus, and non-transitory computer readable medium for wireless communication implemented by a UE is disclosed. The method may include receiving, at a UE a system information message that includes a beam-specific bit-field to indicate a RACH occasion density of one or subset of SSB beams from a plurality of SSB beams. The method may also include determining, in response to receiving the system information message, that a first set of SSB beams from a plurality of SSB beams are configured with a first set of RACH occasion density and a second set of SSB beams from the plurality of SSB beams are configured with a second set of RACH occasion density. In some examples, the first set of RACH occasion density may be greater than the second set of RACH occasion density for the second set of SSB beams. The method may also include selecting at least one RACH occasion within the first set of SSB beams or the second set of SSB beams. The method may also include transmitting, from the UE to the base station, an initial access message on time and frequency resources corresponding to the at least one RACH occasion.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
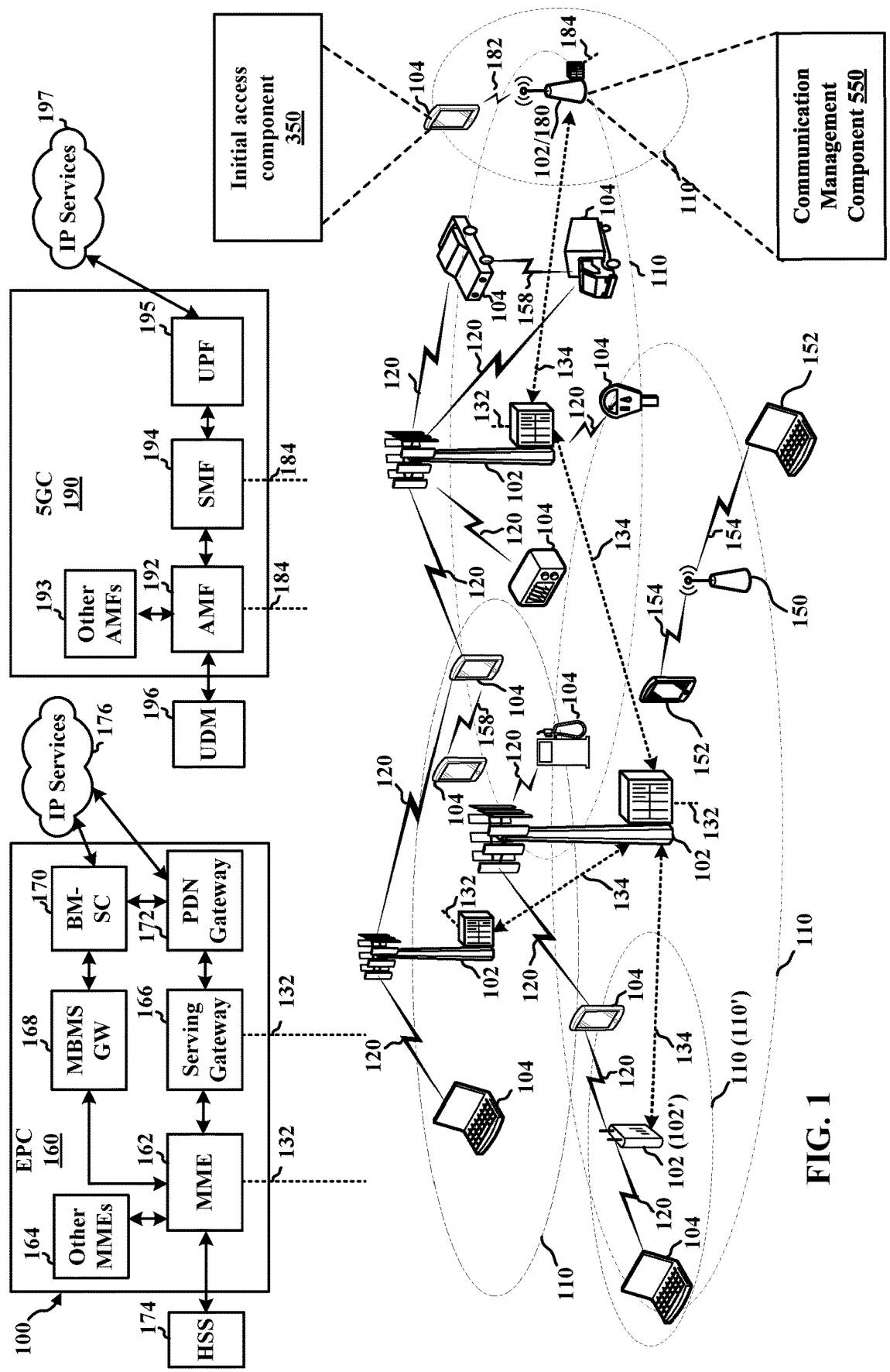
FIG. 1 is a schematic diagram of an example of a wireless communications system in accordance with aspects of the present disclosure.

One aspect of the 5G NR communications technology includes the use of high-frequency spectrum bands, such as those above 24 GHz, which may be referred to as millimeter wave (mmW) bands. The use of these bands enables extremely high data rates and significant increases in data processing capacity. However, compared to LTE, mmW bands are susceptible to rapid channel variations and suffer from severe free-space path loss and atmospheric absorption. In addition, mmW bands are highly vulnerable to blockage (e.g. hand, head, body, foliage, building penetration). Particularly, at mmW frequencies, even small variations in the environment, such as the turn of the head, movement of the hand, or a passing car, may change the channel conditions between the base station (BS) and the user equipment (UE), and thus impact communication performance.

Current mmW 5G NR systems leverage the small wavelengths of mmW at the higher frequencies to make use of multiple input multiple output (MIMO) antenna arrays to create highly directional beams that focus transmitted radio frequency (RF) energy in order to attempt to overcome the propagation and path loss challenges in both the uplink and downlink links. Thus, a UE may use a number of antenna ports (e.g., 1, 2, 4, or 8 antenna ports) associated with arrays of antennas to form beams in various directions using a number of analog weighting factors (e.g., antenna configurations). Similarly, a base station may transmit downlink signals using directional beams.

When attempting to access a network, the UE may use beamforming techniques for random access channel (RACH) transmissions for RACH messages. Such RACH procedures may include multiple RACH messages exchanged between a base station and a UE to establish a connection. Thus, in order to facilitate the communication between a base station and the UE, the base station may support a plurality of beams in different directions. For purposes of this disclosure, the terms "initial access" or "RACH" procedure may refer to a sequence of process between the UE and base station in order for the UE to acquire synchronization and obtain specified identification (ID) for the radio access communication.

Each of the different beams in different directions may be needed to accommodate different network needs (e.g., better coverage cell shape enhancement). Each of the different beams may also support a different number of UEs. For example, a first beam in a first direction may communicate with a single UE, while a second beam may provide coverage for over ten UEs. Thus, the load balancing with respected to number of UEs supported by each beam may not be similar across the plurality of beams. This is particularly true for scenarios where the base station supports one or more reduced capability (RedCap) devices. Specifically, in some scenarios, a number of RedCap and/or internet of things (IoT) devices may also connect to the network. A RedCap device and/or IoT device may be used for several scenarios including wearable devices, industrial wireless sensors, and video surveillance. Some of these scenarios may involve stationary devices and there may be a relatively large number of such devices located within a cell.

The RedCap and IoT devices require a small form factor compared to traditional smartphones. For purposes of this disclosure and unless expressly specified, the terms "RedCap devices" or "IoT devices" may be used interchangeably with "UEs." For stationary RedCap devices, the distribution of the UEs within the base station coverage may also be such that certain beams have much more UEs than other beams leading to overloading of one or more beams in certain directions.

Further, a plurality of RedCap or IOT devices may connect to the same cell or beam, and therefore may need to access the network (using RACH procedure) at the same time causing RACH overloading and congestion. For example, a set of bike shares (e.g., a service in which bicycles are made available for shared use to individuals on a short term basis and may be "rented" or "borrowed" from a dock around cities and returned at another dock belonging to the same system) may be implemented with RedCap or IoT devices. Thus, in scenarios where a large set of bicycles that are parked in the same location (e.g., on a service docket) are unlocked within a short time period (e.g., during rush hour), each IoT device associated with each bicycle may need to send information to the network for billing or tracking within a short period. Similarly, in other IoT applications that may include a plurality of co-located cameras or industrial sensors, each camera or sensor may be scheduled to upload data to the network at a specific time that may overload certain beams in the network.

However, in NR systems, the synchronization signal block (SSB) to physical random access channel occasion (or RACH occasion) beam association may be used by the base station to identify the beam that the UE is using to communicate with the base station. The term "RACH occasion" may refer to resources in time and/or frequency domain that may be available for transmission of PRACH preamble from the UE. In some aspects, a single SSB beam may be associated with a plurality or RACH occasions, or alternatively, a plurality of a plurality of SSBs may be associated with a single RACH occasion. By detecting the RACH occasion that the UE selected for transmission of a PRACH preamble, the network may in turn identify the SSB Beam that UE has selected for communication.

The number of RACH occasions (or alternatively referred to as RACH density) for each beam in current NR systems, however, is generally fixed for all the beams in each direction. In other words, if the base station uses five beams in five different directions, each of the five beams may include the same number of RACH occasions (e.g., three RACH occasions) regardless of the number of UEs that may utilize one or more beams. Thus, in instances where a plurality of RedCap or TOT devices need to access the network (using RACH procedure) at the same time on one or subset of the beams, the limited number of RACH occasions in one direction to serve a large number of UEs may result in RACH overloading and/or congestion.

Aspects of the present disclosure solve the above-identified problem by implementing techniques of adjusting the density and/or number of RACH occasion for one or subset of SSB beams from the plurality of available SSB beams. To this end, features of the present disclosure utilize a beam-specific bit-field that is transmitted by the base station to the UE in remaining minimum system information (RMSI) that may indicate alternative RACH occasion density for a SSB beam or a subset of SSB beams. In some aspects, the time and frequency resources for RACH occasion with beam-specific alternative density may be identified via the resources for general RACH occasions.

Thus, in cases that the base station detects overloading of one or a subset of beams, the base station may increase the number of RACH occasions (or RACH density) for the beams that may be overloaded in order to allow more UEs to initiate RACH procedure without risking collisions or overloading. However, for the beams that may not be overloaded (e.g., beams that serve a low number of UEs), the number of RACH occasions may remain same as originally set by the network. Thus, in accordance with aspects of the present disclosure, the RACH occasions associated for one or more SSB beams may be dynamically adjusted based on the usage and number of UEs served.

In some aspects, the PRACH format and/or type of transmission (e.g. using repetition) utilized by the UE may depend on the associated beam-specific RACH density that is configured by the network. For example, the UEs that may use the SSB beams associated with a higher density of RACH occasions may use a shorter format of PRACH in comparison to traditional PRACH format. In other examples, the UEs that may use SSB beams associated with higher density of RACH occasions may have the option of PRACH repetition on multiple RACH occasions (e.g. using this option if the SSB-based RSRP is less than a certain threshold). In some aspects, the beam-specific PRACH format and/or type of transmission may be indicated together with RACH occasion density in a beam-specific portion of RMSI by the base station. The beam-specific PRACH format and/or type of transmission may also be linked to the beam-specific RACH occasion density (and/or the ratio of beam-specific RACH occasion density, compared to the general RACH occasion density), based on predefined standard specifications. It should be appreciated that aspects of the present disclosure may also be applicable depending on frequency range, sub carrier spacing, and/or number of SSB beams.

Various aspects are now described in more detail with reference to the FIGS. 1-5. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, base station 102 may have a modem 514 and a communication management module 550 (see FIG. 5) for adjusting the density and/or number of RACH occasions for one or subset of SSB beams from the plurality of available SSB beams. To this end, features of the present disclosure utilize a beam-specific bit-field that is transmitted by the base station to the UE that may indicate RACH occasion density for a SSB beam or a subset of SSB beams. In some aspects, the time and frequency resources for RACH occasion with beam-specific alternative density may be identified via the resources for general RACH occasions. Based on the adjusted RACH occasion density, the UE may select one or time and frequency resources to initiate access with the base station.

In some aspects, the UE 104 may have a modem 314 and an initial access module 350 (see FIG. 4) for receiving the RMSI with a beam-specific bit-field that is transmitted by the base station to identify RACH occasion density for a SSB beam or a subset of SSB beams. In turn, the UE 104 may select one or more RACH occasions in order to initial RACH procedure with the base station 102.

The base stations 102 may also be configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
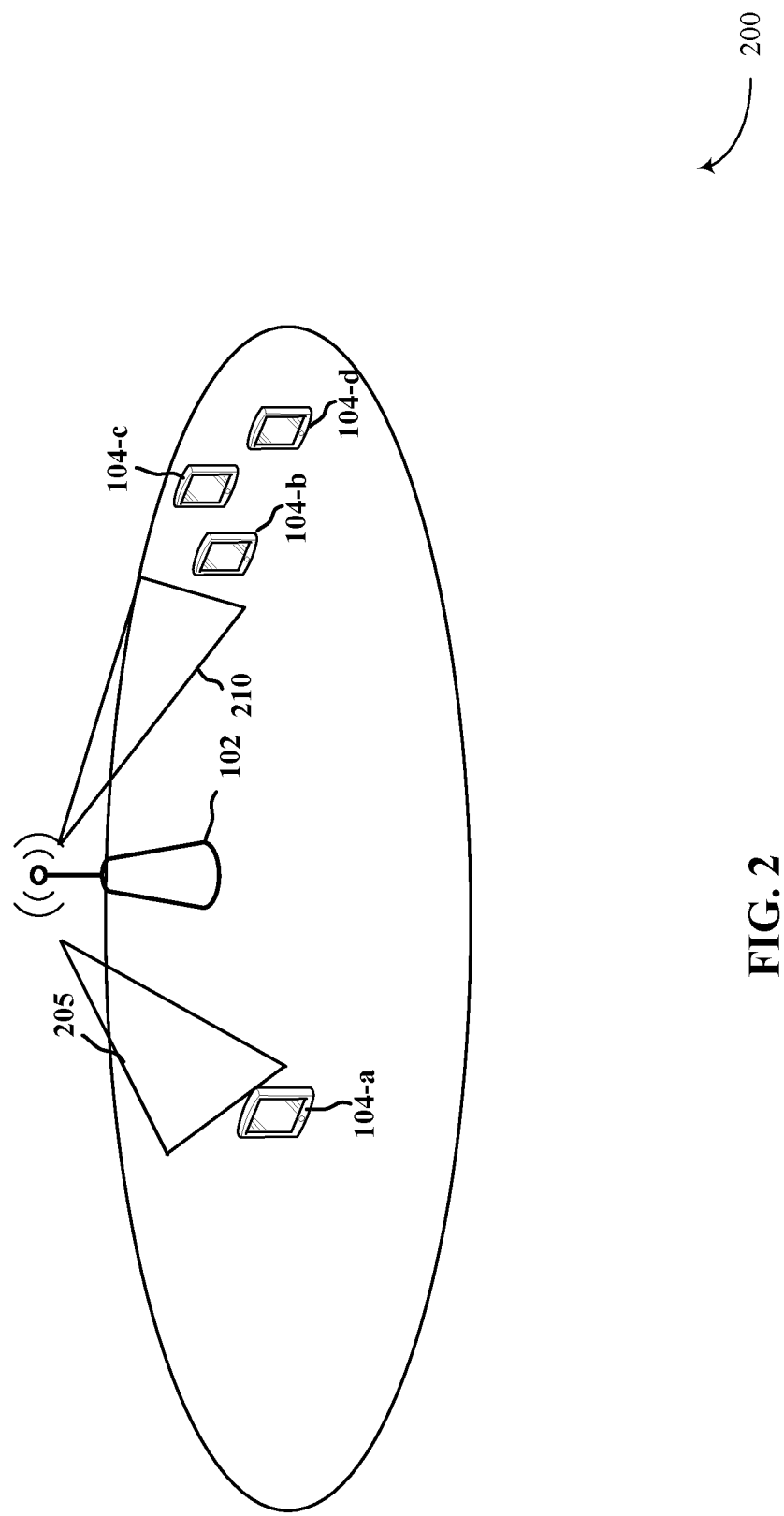
FIG. 2 is a schematic diagram of an example of adjusting the RACH density or occasions associated with one or subset of SSB beams in accordance with aspects of the present disclosure.

FIG. 2 is a schematic diagram 200 of an example of adjusting the RACH density or occasions associated with one or subset of SSB beams. Specifically, in some examples, the base station. As noted above, when attempting to access a network, the UE may use beamforming techniques initiate access to the base station. Such RACH procedures may include multiple RACH messages exchanged between a base station 102 and a UE 104 to establish a connection. Thus, in order to facilitate the communication between a base station 102 and one or more UEs 104, the base station 102 may support a plurality of beams (e.g., first beam 205 and second beam 210) in different directions.

Each of the different beams (205, 210) in different directions may be needed to accommodate a different number of UEs. For example, a first beam 205 in a first direction may communicate with a single UE 104-a, while a second beam 210 may provide coverage for second UE 104-b, third UE 104-c, and fourth UE 104-d. Thus, the load balancing with respected to number of UEs 104 supported by each beam may not be similar across the plurality of beams.

In some aspects, a single SSB beam may be associated with a plurality or RACH occasions, or alternatively, a plurality of a plurality of SSBs may be associated with a single RACH occasion. By detecting the RACH occasion that the UE 104 selected for transmission of a PRACH preamble, the network may in turn identify the SSB beam that UE has selected for communication. The number of RACH occasions (or alternatively referred to as RACH density) for each beam in current NR systems, however, is generally fixed for all the beams in each direction. In other words, both the first beam 205 and second beam 210 in the illustrated example may include the same number of RACH occasions (e.g., 2 RACH occasions) regardless of the number of UEs that may utilize one or more beams. Thus, in instances where a plurality of UEs 104 need to access the network (using RACH procedure) at the same time on one or subset of the beams, the limited number of RACH occasions in one direction to serve a large number of UEs may result in RACH overloading and/or congestion.

Aspects of the present disclosure provide techniques of adjusting the density and/or number of RACH occasion for one or subset of SSB beams from the plurality of available SSB beams. To this end, features of the present disclosure utilize a beam-specific bit-field that is transmitted by the base station 102 to the UE 104 in RMSI that may indicate alternative RACH occasion density for a SSB beam or a subset of SSB beams. In some aspects, the time and frequency resources for RACH occasion with beam-specific alternative density may be identified via the resources for general RACH occasions.

For example, in cases that the base station 102 may detect overloading of one or a subset of beams (e.g., second beam 210), the base station 102 may increase the number of RACH occasions (or RACH density) for the second beam 210 in order to allow more UEs (e.g., second UE 104-b, third UE 104-c, and fourth UE 104-d) to initiate RACH procedure without risking collisions or overloading. However, for the beams that may not be overloaded (e.g., first beam 205), the number of RACH occasions may remain same as originally set by the network. Thus, in accordance with aspects of the present disclosure, the RACH occasions associated for one or more SSB beams may be dynamically adjusted based on the usage and number of UEs served.

In some aspects, the PRACH format and/or type of transmission (e.g. using repetition) utilized by the UE may depend on the associated beam-specific RACH density that is configured by the network. For example, the UEs 104 (e.g., second UE 104-b, third UE 104-c, and fourth UE 104-d) that may use the SSB beams associated with a higher density of RACH occasions may use a shorter format of PRACH in comparison to traditional PRACH format. In other examples, the UEs 104 (e.g., second UE 104-b, third UE 104-c, and fourth UE 104-d) that may use SSB beams associated with higher density of RACH occasions may have the option of PRACH repetition on multiple RACH occasions (e.g. using this option if the SSB-based RSRP is less than a certain threshold). In some aspects, the beam-specific PRACH format and/or type of transmission may be indicated together with RACH occasion density in a beam-specific portion of RMSI by the base station. The beam-specific PRACH format and/or type of transmission may also be linked to the beam-specific RACH occasion density (and/or the ratio of beam-specific RACH occasion density, compared to the general RACH occasion density), based on predefined standard specifications. It should be appreciated that aspects of the present disclosure may also be applicable depending on frequency range, subcarrier spacing, and/or number of SSB beams.

Figure 3:
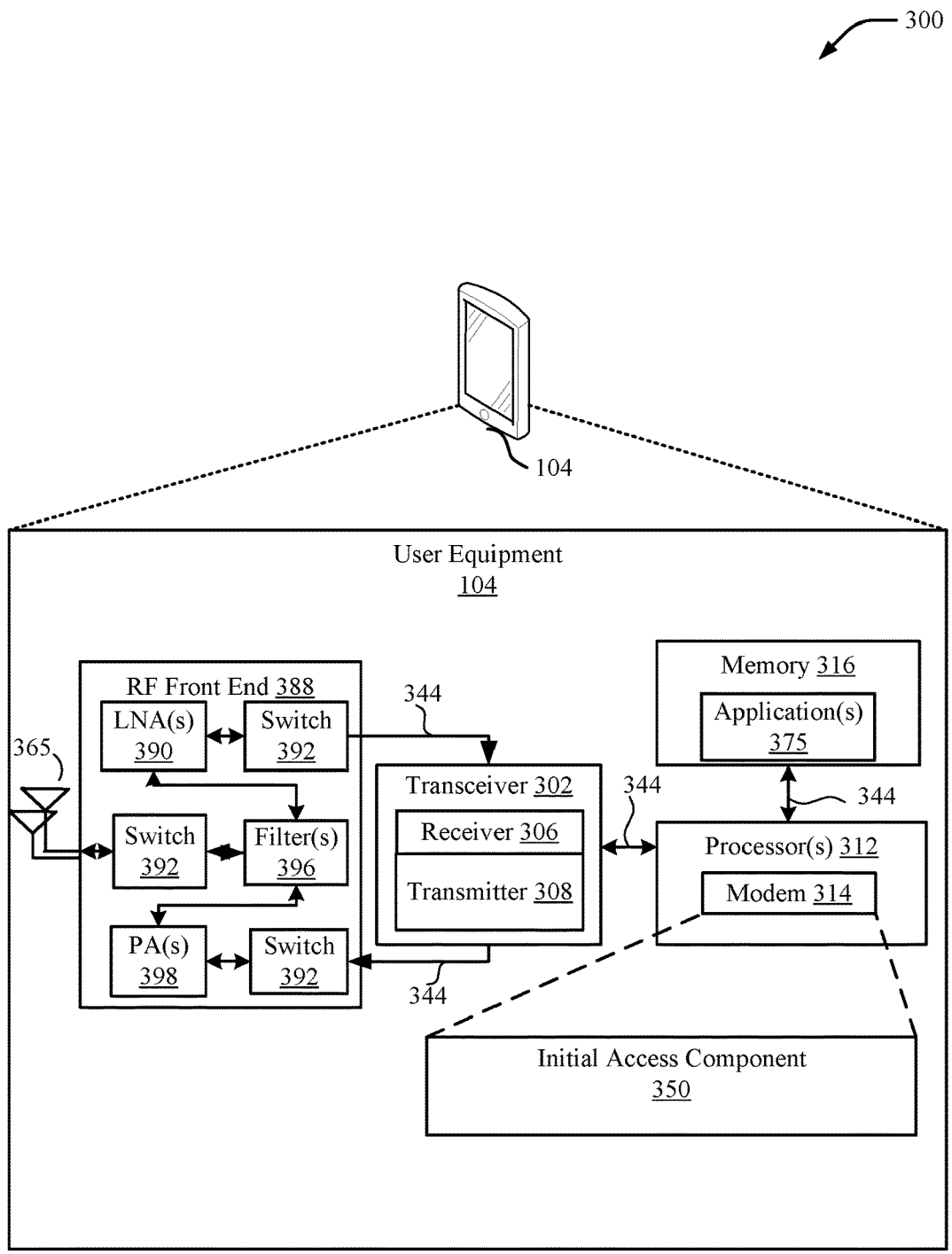
FIG. 3 is a schematic diagram of an example implementation of various components of a user equipment in accordance with various aspects of the present disclosure.

FIG. 3 illustrates a hardware components and subcomponents of a device that may be a UE 104 for implementing one or more methods (e.g., method 400) described herein in accordance with various aspects of the present disclosure. For example, one example of an implementation of the UE 104 may include a variety of components, some of which have already been described above, but including components such as one or more processors 312, memory 316 and transceiver 302 in communication via one or more buses 344, which may operate in conjunction with the initial access component 350 to perform functions described herein related to including one or more methods (e.g., 400) of the present disclosure. Particularly, the initial access module 350 may receive the RMSI with a beam-specific bit-field that is transmitted by the base station to identify RACH occasion density for a SSB beam or a subset of SSB beams. In turn, the initial access module 350 may select one or more RACH occasions in order to initial RACH procedure with the base station 102.

The one or more processors 312, modem 314, memory 316, transceiver 302, RF front end 388 and one or more antennas 365, may be configured to support voice and/or data calls (simultaneously or non-simultaneously) in one or more radio access technologies. In an aspect, the one or more processors 312 can include a modem 314 that uses one or more modem processors. The various functions related to initial access module 350 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 412 and/or modem 314 associated with initial access module 350 may be performed by transceiver 302.

The memory 316 may be configured to store data used herein and/or local versions of application(s) 375 or initial access module 350 and/or one or more of its subcomponents being executed by at least one processor 312. The memory 316 can include any type of computer-readable medium usable by a computer or at least one processor 412, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining initial access module 350 and/or one or more of its subcomponents, and/or data associated therewith, when the UE 104 is operating at least one processor 312 to execute initial access module 350 and/or one or more of its subcomponents.

The transceiver 402 may include at least one receiver 306 and at least one transmitter 308. The receiver 306 may include hardware, firmware, and/or software code executable by a processor for receiving data, the code comprising instructions and being stored in a memory (e.g., computer-readable medium). The receiver 306 may be, for example, a radio frequency (RF) receiver. In an aspect, the receiver 306 may receive signals transmitted by at least one UE 104. Additionally, receiver 306 may process such received signals, and also may obtain measurements of the signals, such as, but not limited to, Ec/Io, SNR, RSRP, RSSI, etc. The transmitter 308 may include hardware, firmware, and/or software code executable by a processor for transmitting data, the code comprising instructions and being stored in a memory (e.g., computer-readable medium). A suitable example of the transmitter 308 may including, but is not limited to, an RF transmitter.

Moreover, in an aspect, transmitting device may include the RF front end 388, which may operate in communication with one or more antennas 365 and transceiver 302 for receiving and transmitting radio transmissions, for example, wireless communications transmitted by at least one base station 102 or wireless transmissions transmitted by UE 104. The RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, the LNA 390 can amplify a received signal at a desired output level. In an aspect, each LNA 390 may have a specified minimum and maximum gain values. In an aspect, the RF front end 388 may use one or more switches 392 to select a particular LNA 390 and its specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and its specified gain value based on a desired gain value for a particular application.

Also, for example, one or more filters 396 can be used by the RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, the RF front end 388 can use one or more switches 392 to select a transmit or receive path using a specified filter 396, LNA 390, and/or PA 398, based on a configuration as specified by the transceiver 302 and/or processor 312.

As such, the transceiver 302 may be configured to transmit and receive wireless signals through one or more antennas 365 via the RF front end 388. In an aspect, the transceiver 302 may be tuned to operate at specified frequencies such that transmitting device can communicate with, for example, one or more base stations 102 or one or more cells associated with one or more base stations 102 or other UEs 104. In an aspect, for example, the modem 314 can configure the transceiver 302 to operate at a specified frequency and power level based on the configuration of the transmitting device and the communication protocol used by the modem 314.

In an aspect, the modem 314 can be a multiband-multi-mode modem, which can process digital data and communicate with the transceiver 302 such that the digital data is sent and received using the transceiver 302. In an aspect, the modem 314 can be multiband and be configured to support multiple frequency bands for a specific communications protocol. In an aspect, the modem 314 can be multimode and be configured to support multiple operating networks and communications protocols. In an aspect, the modem 314 can control one or more components of transmitting device (e.g., RF front end 388, transceiver 302) to enable transmission and/or reception of signals from the network based on a specified modem configuration. In an aspect, the modem configuration can be based on the mode of the modem 314 and the frequency band in use. In another aspect, the modem configuration can be based on UE configuration information associated with transmitting device as provided by the network during cell selection and/or cell reselection.

Figure 4:
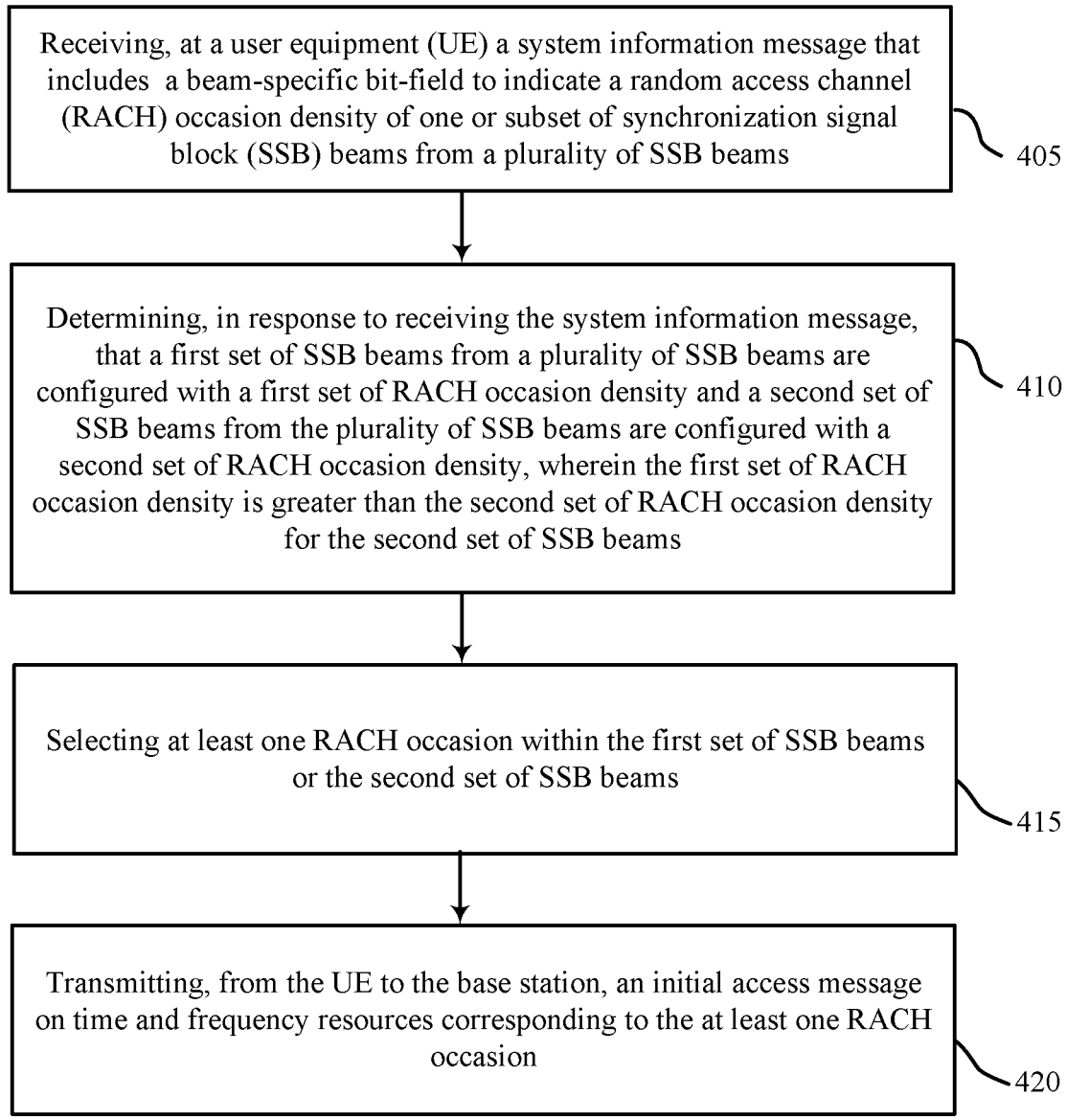
FIG. 4 is a flow diagram of an example of a method of wireless communication implemented by the UE in accordance with aspects of the present disclosure.

Referring to FIG. 4, an example method 400 for wireless communications in accordance with aspects of the present disclosure may be performed by one or more UEs 104 discussed with reference to FIGS. 1 and 2. Although the method 400 is described below with respect to the elements of the UE 104, other components may be used to implement one or more of the steps described herein.

At block 405, the method 400 may include receiving, at a UE a system information message that includes a beam-specific bit-field to indicate a RACH occasion density of one or subset of SSB beams from a plurality of SSB beams. In some examples, the system information message may be a RMSI message. The system information message may also include information related to format of a PRACH preamble message that the one or more UEs are to utilize for initial access with the base station. In some examples, the one or more UEs that utilize resources from the first set of RACH occasion density associated with the first set of SSB beams may be configured to utilize a shorter format of PRACH preamble message than the one or more UEs that utilize resources from the second set of RACH occasion density associated with the second set of SSB beams. In some aspects, the one or more UEs that utilize resources from the first set of RACH occasion density associated with the first set of SSB beams may be configured to transmit the PRACH preamble message repeatedly over a plurality of RACH occasions. Aspects of block 405 may be performed by the transceiver 302 and the initial access component 350 as described with reference to FIG. 3. Thus, initial access component 350, transceiver 302, one or more antennas 365, modem 314, processor 312, and/or the UE 104 or one of its subcomponents may define the means for receiving, at a UE a system information message that includes a beam-specific bit-field to indicate a RACH occasion density of one or subset of SSB beams from a plurality of SSB beams.

At block 410, the method may 400 may include determining, in response to receiving the system information message, that a first set of SSB beams from a plurality of SSB beams are configured with a first set of RACH occasion density and a second set of SSB beams from the plurality of SSB beams are configured with a second set of RACH occasion density, wherein the first set of RACH occasion density is greater than the second set of RACH occasion density for the second set of SSB beams. Aspects of block 410 may be performed by the initial access component 350 as described with reference to FIG. 3. Thus, initial access component 350, modem 314, processor 312, and/or the UE 104 or one of its subcomponents may define the means for determining, in response to receiving the system information message, that a first set of SSB beams from a plurality of SSB beams are configured with a first set of RACH occasion density and a second set of SSB beams from the plurality of SSB beams are configured with a second set of RACH occasion density.

At block 415, the method 400 may include selecting at least one RACH occasion within the first set of SSB beams or the second set of SSB beams. Aspects of block 415 may be performed by the initial access component 350 as described with reference to FIG. 3. Thus, initial access component 350, modem 314, processor 312, and/or the UE 104 or one of its subcomponents may define the means for determining, in response to selecting at least one RACH occasion within the first set of SSB beams or the second set of SSB beams.

At block 420, the method 400 may include transmitting, from the UE to the base station, an initial access message on time and frequency resources corresponding to the at least one RACH occasion. Aspects of block 420 may be performed by the transceiver 302 and the initial access component 350 as described with reference to FIG. 3. Thus, initial access component 350, transceiver 302, one or more antennas 365, modem 314, processor 312, and/or the UE 104 or one of its subcomponents may define the means for transmitting, from the UE to the base station, an initial access message on time and frequency resources corresponding to the at least one RACH occasion.

Figure 5:
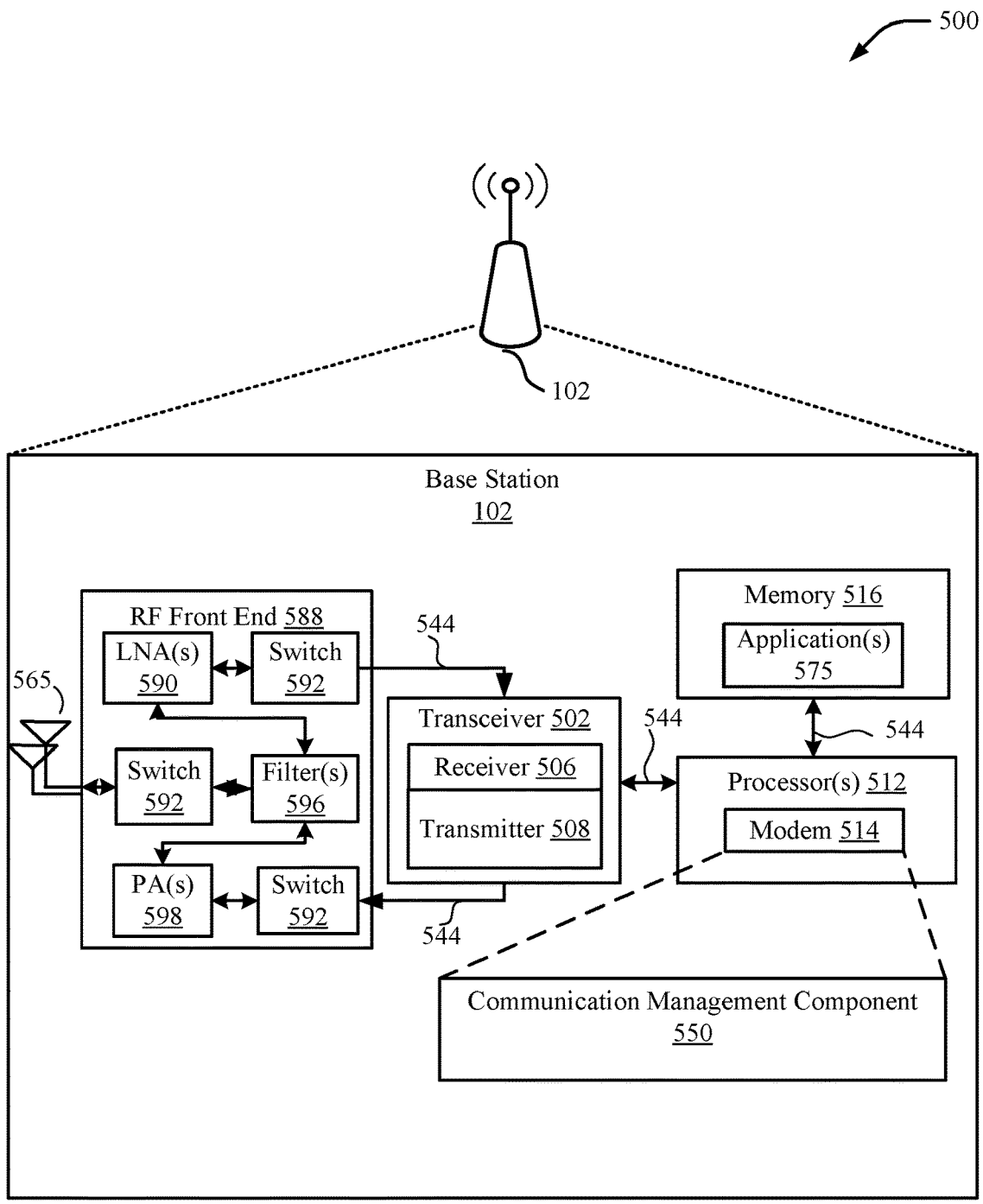
FIG. 5 is a schematic diagram of an example implementation of various components of a base station in accordance with various aspects of the present disclosure.

FIG. 5 illustrates a hardware components and subcomponents of a device that may be a base station 102 for implementing one or more methods (e.g., method 600) described herein in accordance with various aspects of the present disclosure. For example, one example of an implementation of the base station 102 may include a variety of components, some of which have already been described above, but including components such as one or more processors 512, memory 516 and transceiver 502 in communication via one or more buses 544, which may operate in conjunction with the communication management component 550 to perform functions described herein related to including one or more methods (e.g., 600) of the present disclosure. Particularly, communication management component 550 may adjust the density and/or number of RACH occasions for one or subset of SSB beams from the plurality of available SSB beams. To this end, the communication management component 550 may utilize a beam-specific bit-field that is transmitted by the base station to the UE that may indicate RACH occasion density for a SSB beam or a subset of SSB beams. In some aspects, the time and frequency resources for RACH occasion with beam-specific alternative density may be identified via the resources for general RACH occasions. Based on the adjusted RACH occasion density, the UE 104 may select one or time and frequency resources to initiate access with the base station.

The one or more processors 512, modem 514, memory 516, transceiver 502, RF front end 588 and one or more antennas 565, may be configured to support voice and/or data calls (simultaneously or non-simultaneously) in one or more radio access technologies. In an aspect, the one or more processors 512 can include a modem 514 that uses one or more modem processors. The various functions related to communication management component 550 may be included in modem 514 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 514 associated with initial access module 350 may be performed by transceiver 502.

The memory 516 may be configured to store data used herein and/or local versions of application(s) 575 or communication management component 550 and/or one or more of its subcomponents being executed by at least one processor 512. The memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, the memory 516 may be a non-transitory computer-readable storage medium that stores one or more computer-executable codes defining communication management component 550 and/or one or more of its subcomponents, and/or data associated therewith, when the base station 102 is operating at least one processor 512 to execute communication management component 550 and/or one or more of its subcomponents.

The transceiver 502 may include at least one receiver 506 and at least one transmitter 508. The receiver 506 may include hardware, firmware, and/or software code executable by a processor for receiving data, the code comprising instructions and being stored in a memory (e.g., computer-readable medium). The receiver 506 may be, for example, a radio frequency (RF) receiver. In an aspect, the receiver 506 may receive signals transmitted by at least one UE 104. Additionally, receiver 506 may process such received signals, and also may obtain measurements of the signals, such as, but not limited to, Ec/Io, SNR, RSRP, RSSI, etc. The transmitter 508 may include hardware, firmware, and/or software code executable by a processor for transmitting data, the code comprising instructions and being stored in a memory (e.g., computer-readable medium). A suitable example of the transmitter 508 may including, but is not limited to, an RF transmitter.

Moreover, in an aspect, transmitting device may include the RF front end 588, which may operate in communication with one or more antennas 565 and transceiver 502 for receiving and transmitting radio transmissions, for example, wireless communications transmitted by at least one base station 102 or wireless transmissions transmitted by UE 104. The RF front end 588 may be connected to one or more antennas 365 and can include one or more low-noise amplifiers (LNAs) 590, one or more switches 592, one or more power amplifiers (PAs) 598, and one or more filters 596 for transmitting and receiving RF signals.

In an aspect, the LNA 590 can amplify a received signal at a desired output level. In an aspect, each LNA 590 may have a specified minimum and maximum gain values. In an aspect, the RF front end 588 may use one or more switches 592 to select a particular LNA 590 and its specified gain value based on a desired gain value for a particular application.

Further, for example, one or more PA(s) 598 may be used by the RF front end 588 to amplify a signal for an RF output at a desired output power level. In an aspect, each PA 598 may have specified minimum and maximum gain values. In an aspect, the RF front end 588 may use one or more switches 592 to select a particular PA 598 and its specified gain value based on a desired gain value for a particular application.

Also, for example, one or more filters 596 can be used by the RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, the RF front end 588 can use one or more switches 592 to select a transmit or receive path using a specified filter 596, LNA 590, and/or PA 598, based on a configuration as specified by the transceiver 502 and/or processor 512.

As such, the transceiver 502 may be configured to transmit and receive wireless signals through one or more antennas 565 via the RF front end 588. In an aspect, the transceiver 502 may be tuned to operate at specified frequencies such that transmitting device can communicate with, for example, one or more UEs 104. In an aspect, for example, the modem 514 can configure the transceiver 502 to operate at a specified frequency and power level based on the configuration of the transmitting device and the communication protocol used by the modem 514.

In an aspect, the modem 514 can be a multiband-multimode modem, which can process digital data and communicate with the transceiver 502 such that the digital data is sent and received using the transceiver 502. In an aspect, the modem 514 can be multiband and be configured to support multiple frequency bands for a specific communications protocol. In an aspect, the modem 514 can be multimode and be configured to support multiple operating networks and communications protocols. In an aspect, the modem 514 can control one or more components of transmitting device (e.g., RF front end 588, transceiver 502) to enable transmission and/or reception of signals from the network based on a specified modem configuration. In an aspect, the modem configuration can be based on the mode of the modem 514 and the frequency band in use. In another aspect, the modem configuration can be based on UE configuration information associated with transmitting device as provided by the network during cell selection and/or cell reselection.

Figure 6:
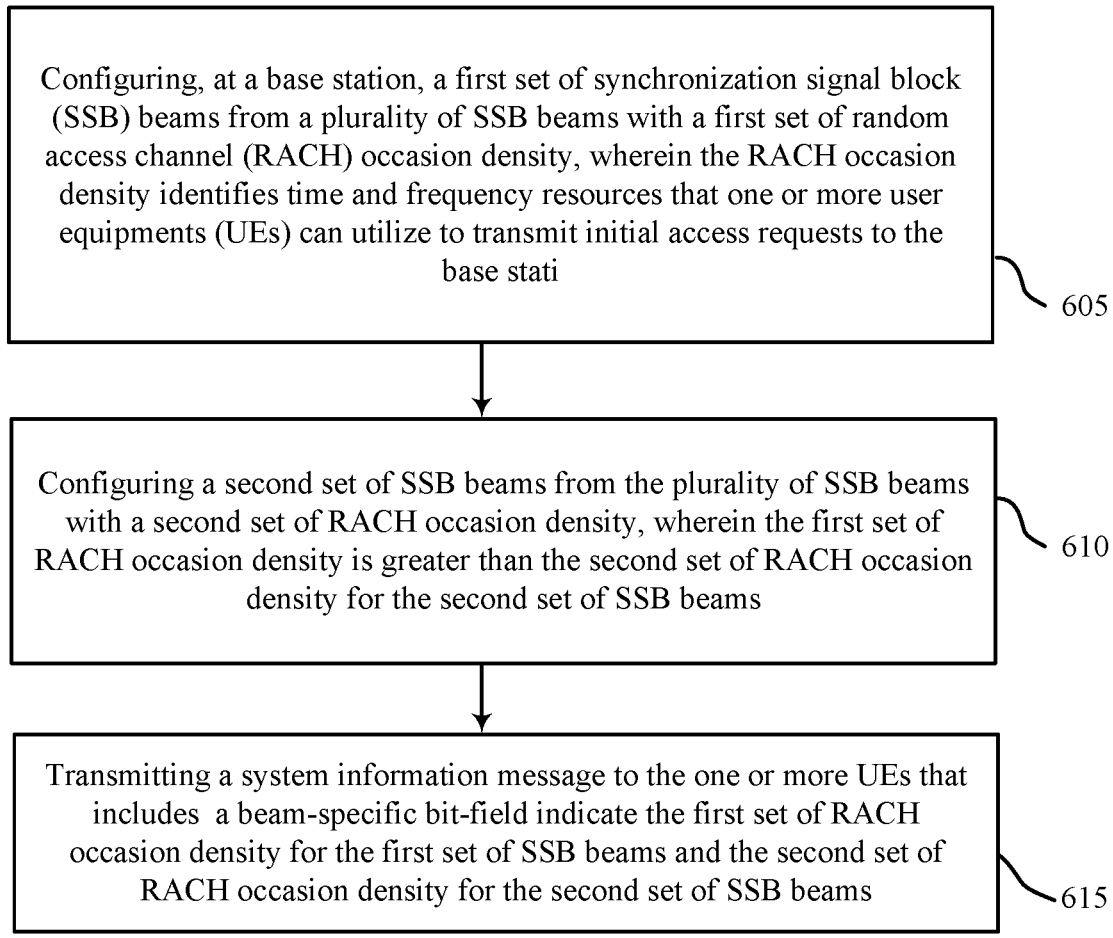
FIG. 6 is a flow diagram of an example of a method of wireless communication implemented by the base station in accordance with aspects of the present disclosure.

Referring to FIG. 6, an example method 600 for wireless communications in accordance with aspects of the present disclosure may be performed by one or more base stations 102 discussed with reference to FIGS. 1 and 2. Although the method 600 is described below with respect to the elements of the base station 102, other components may be used to implement one or more of the steps described herein.

At block 605, the method 600 may include configuring, at a base station, a first set of SSB beams from a plurality of SSB beams with a first set of RACH occasion density, wherein the RACH occasion density identifies time and frequency resources that one or more UEs can utilize to transmit initial access requests to the base station. Aspects of block 605 may be performed by the communication management component 550 as described with reference to FIG. 5. Thus, communication management component 550, modem 514, processor 512, and/or the base station or one of its subcomponents may define the means for configuring, at a base station, a first set of SSB beams from a plurality of SSB beams with a first set of RACH occasion density.

At block 610, the method 600 may include configuring a second set of SSB beams from the plurality of SSB beams with a second set of RACH occasion density, wherein the first set of RACH occasion density is greater than the second set of RACH occasion density for the second set of SSB beams. Aspects of block 610 may also be performed by the communication management component 550 as described with reference to FIG. 5. Thus, communication management component 550, modem 514, processor 512, and/or the base station or one of its subcomponents may define the means for configuring a second set of SSB beams from the plurality of SSB beams with a second set of RACH occasion density, wherein the first set of RACH occasion density is greater than the second set of RACH occasion density for the second set of SSB beams.

At block 615, the method 600 may include transmitting a system information message to the one or more UEs that includes a beam-specific bit-field indicate the first set of RACH occasion density for the first set of SSB beams and the second set of RACH occasion density for the second set of SSB beams.

In some examples, the system information message further includes information related to format of a physical random access channel (PRACH) preamble message that the one or more UEs are to utilize for initial access with the base station. In some examples, the one or more UEs that utilize resources from the first set of RACH occasion density associated with the first set of SSB beams may be configured to utilize a shorter format of PRACH preamble message than the one or more UEs that utilize resources from the second set of RACH occasion density associated with the second set of SSB beams. In some aspects, the one or more UEs that utilize resources from the first set of RACH occasion density associated with the first set of SSB beams may be configured to transmit the PRACH preamble message repeatedly over a plurality of RACH occasions. Aspects of block 615 may be performed by transceiver 502, one or more antennas 565, and the communication management component 550 as described with reference to FIG. 5. Thus, communication management component 550, transceiver 502, one or more antennas 565, modem 514, processor 512, and/or the base station or one of its subcomponents may define the means for transmitting a system information message to the one or more UEs that includes a beam-specific bit-field indicate the first set of RACH occasion density for the first set of SSB beams and the second set of RACH occasion density for the second set of SSB beams.

In some examples, the method 600 may also include receiving a PRACH preamble message from at least one UE over a RACH occasion selected from the first set of RACH occasion density for the first set of SSB beams or the second set of RACH occasion density for the second set of SSB beams. The method may further include identifying a SSB beam that the UE utilized for transmission of the PRACH preamble message based on time and frequency resources associated with the RACH occasion selected. The method may further include establishing communication with the UE over the SSB beam.

Some Further Example Clauses

Implementation examples are described in the following numbered clauses:

1. A method for wireless communications, comprising:
configuring, at a base station, a first set of synchronization signal block (SSB) beams from a plurality of SSB beams with a first set of random access channel (RACH) occasion density, wherein the RACH occasion density identifies time and frequency resources that one or more user equipments (UEs) can utilize to transmit initial access requests to the base station;
configuring a second set of SSB beams from the plurality of SSB beams with a second set of RACH occasion density, wherein the first set of RACH occasion density is greater than the second set of RACH occasion density for the second set of SSB beams;
and transmitting a system information message to the one or more UEs that includes a beam-specific bit-field to indicate the first set of RACH occasion density for the first set of SSB beams and the second set of RACH occasion density for the second set of SSB beams.

2. The method of clause 1, further comprising:
receiving a physical random access channel (PRACH) preamble message from at least one UE over time and frequency resources selected from the first set of RACH occasion density for the first set of SSB beams or the second set of RACH occasion density for the second set of SSB beams;
identifying a SSB beam that the UE utilized for transmission of the PRACH preamble message based on the time and frequency resources over which the PRACH preamble is received; and
establishing communication with the UE over the SSB beam.

3. The method of clause 1 or 2, wherein the system information message further includes information related to format of a physical random access channel (PRACH) preamble message that the one or more UEs are to utilize for initial access with the base station.

4. The method of any of preceding clauses 1-3, wherein the one or more UEs that utilize resources from the first set of RACH occasion density associated with the first set of SSB beams are configured to utilize a shorter format of PRACH preamble message than the one or more UEs that utilize resources from the second set of RACH occasion density associated with the second set of SSB beams.

5. The method of any of preceding clauses 1-4, wherein the one or more UEs that utilize resources from the first set of RACH occasion density associated with the first set of SSB beams are configured to transmit the PRACH preamble message repeatedly over a plurality of RACH occasions.

6. The method of any of preceding clauses 1-5, wherein the system information message is a remaining minimum system information (RMSI).

7. An apparatus for wireless communications, comprising:
at least one processor;
and memory coupled to the at least one processor, the memory including instructions executable by the at least one processor to cause the apparatus to:
configure, at a base station, a first set of synchronization signal block (SSB) beams from a plurality of SSB beams with a first set of random access channel (RACH) occasion density, wherein the RACH occasion density identifies time and frequency resources that one or more user equipments (UEs) can utilize to transmit initial access requests to the base station;
configure a second set of SSB beams from the plurality of SSB beams with a second set of RACH occasion density, wherein the first set of RACH occasion density is greater than the second set of RACH occasion density for the second set of SSB beams; and
transmit a system information message to the one or more UEs that includes a beam-specific bit-field indicate the first set of RACH occasion density for the first set of SSB beams and the second set of RACH occasion density for the second set of SSB beams.

8. The apparatus of clause 7, wherein the instructions are further executable by the at least one processor to cause the apparatus to:
receive a physical random access channel (PRACH) preamble message from at least one UE over time and frequency resources selected from the first set of RACH occasion density for the first set of SSB beams or the second set of RACH occasion density for the second set of SSB beams;
identify a SSB beam that the UE utilized for transmission of the PRACH preamble message based on the time and frequency resources over which the PRACH preamble is received; and
establish communication with the UE over the SSB beam.

9. The apparatus of clauses 7 or 8, wherein the system information message further includes information related to format of a physical random access channel (PRACH) preamble message that the one or more UEs are to utilize for initial access with the base station.

10. The apparatus of any of preceding clauses 7-9, wherein the one or more UEs that utilize resources from the first set of RACH occasion density associated with the first set of SSB beams are configured to utilize a shorter format of PRACH preamble message than the one or more UEs that utilize resources from the second set of RACH occasion density associated with the second set of SSB beams.

11. The apparatus of any of preceding clauses 7-10, wherein the one or more UEs that utilize resources from the first set of RACH occasion density associated with the first set of SSB beams are configured to transmit the PRACH preamble message repeatedly over a plurality of RACH occasions.

12. The apparatus of any of preceding clauses 7-11, wherein the system information message is a remaining minimum system information (RMSI).

13. A method for wireless communications, comprising:
   receiving, at a user equipment (UE) a system information message that includes a beam-specific bit-field to indicate a random access channel (RACH) occasion density of one or subset of synchronization signal block (SSB) beams from a plurality of SSB beams;
   determining, in response to receiving the system information message, that a first set of SSB beams from a plurality of SSB beams are configured with a first set of RACH occasion density and a second set of SSB beams from the plurality of SSB beams are configured with a second set of RACH occasion density, wherein the first set of RACH occasion density is greater than the second set of RACH occasion density for the second set of SSB beams;
   selecting at least one RACH occasion within the first set of SSB beams or the second set of SSB beams; and
   transmitting, from the UE to the base station, an initial access message on time and frequency resources corresponding to the at least one RACH occasion.

14. The method of clause 13, wherein the system information message further includes information related to format of a physical random access channel (PRACH) preamble message that the one or more UEs are to utilize for initial access with the base station.

15. The method of clauses 13 or 14, wherein transmitting the initial access message on the time and frequency resources corresponding to the at least one RACH occasion, comprises:
   determining that the UE will transmit on resources from the first set of RACH occasion density associated with the first set of SSB beams; and
   generating the PRACH preamble message whose format is shorter than if the UE were to select the at least one RACH occasion from the second set of RACH occasion density associated with the second set of SSB beams.

16. The method of any of preceding clauses 13-15, wherein transmitting the initial access message on the time and frequency resources corresponding to the at least one RACH occasion, comprises:
   transmitting the PRACH preamble message repeatedly over a plurality of RACH occasions from the first set of RACH occasion density associated with the first set of SSB beams.

17. The method of any of preceding clauses 13-17, wherein the system information message is a remaining minimum system information (RMSI).

18. An apparatus for wireless communications, comprising:
   at least one processor;
   and memory coupled to the at least one processor, the memory including instructions executable by the at least one processor to cause the apparatus to:
      receive, at a user equipment (UE) a system information message that includes a beam-specific bit-field to indicate a random access channel (RACH) occasion density of one or subset of synchronization signal block (SSB) beams from a plurality of SSB beams;
      determine, in response to receiving the system information message, that a first set of SSB beams from a plurality of SSB beams are configured with a first set of RACH occasion density and a second set of SSB beams from the plurality of SSB beams are configured with a second set of RACH occasion density, wherein the first set of RACH occasion density is greater than the second set of RACH occasion density for the second set of SSB beams;
      select at least one RACH occasion within the first set of SSB beams or the second set of SSB beams; and
      transmit, from the UE to the base station, an initial access message on time and frequency resources corresponding to the at least one RACH occasion.

19. The apparatus of clause 18, wherein the system information message further includes information related to format of a physical random access channel (PRACH) preamble message that the one or more UEs are to utilize for initial access with the base station.

20. The apparatus of clauses 18 or 19, wherein the instructions to transmit the initial access message on the time and frequency resources corresponding to the at least one RACH occasion are further executable by the at least one processor to:
   determine that the UE will transmit on resources from the first set of RACH occasion density associated with the first set of SSB beams; and
   generate the PRACH preamble message whose format is shorter than if the UE were to select the at least one RACH occasion from the second set of RACH occasion density associated with the second set of SSB beams.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems are also presented with reference to various apparatus and methods. These apparatus and methods are described in the detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout the disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A and/or 5G New Radio (NR) system for purposes of example, and LTE or 5G NR terminology is used in much of the description below, although the techniques are applicable beyond LTE/LTE-A and 5G NR applications, e.g., to other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
configuring, at a base station, a first set of synchronization signal block (SSB) beams from a plurality of SSB beams with a first set of random access channel (RACH) occasion density, wherein the RACH occasion density identifies time and frequency resources that one or more user equipments (UEs) can utilize to transmit initial access requests to the base station;
configuring a second set of SSB beams from the plurality of SSB beams with a second set of RACH occasion density, wherein the first set of RACH occasion density is greater than the second set of RACH occasion density for the second set of SSB beams; and
transmitting a system information message to the one or more UEs that includes a beam-specific bit-field to indicate the first set of RACH occasion density for the first set of SSB beams and the second set of RACH occasion density for the second set of SSB beams.

2. The method of claim 1, further comprising:
receiving a physical random access channel (PRACH) preamble message from at least one UE over time and frequency resources selected from the first set of RACH occasion density for the first set of SSB beams or the second set of RACH occasion density for the second set of SSB beams;
identifying a SSB beam that the at least one UE utilized for transmission of the PRACH preamble message based on the time and frequency resources over which the PRACH preamble is received; and
establishing communication with the UE over the SSB beam.

3. The method of claim 1, wherein the system information message further includes information related to format of a physical random access channel (PRACH) preamble message that the one or more UEs are to utilize for initial access with the base station.

4. The method of claim 3, wherein the one or more UEs that utilize resources from the first set of RACH occasion density associated with the first set of SSB beams are configured to utilize a shorter format of PRACH preamble message than the one or more UEs that utilize resources from the second set of RACH occasion density associated with the second set of SSB beams.

5. The method of claim 3, wherein the one or more UEs that utilize resources from the first set of RACH occasion density associated with the first set of SSB beams are configured to transmit the PRACH preamble message repeatedly over a plurality of RACH occasions.

6. The method of claim 1, wherein the system information message is a remaining minimum system information (RMSI).

7. An apparatus for wireless communications, comprising:
one or more processors;
and one or more memories coupled to the one or more processors, the one or more memories, individually or in combination, including instructions executable by the one or more processors, individually or in combination, configured to cause the apparatus to:
configure, a first set of synchronization signal block (SSB) beams from a plurality of SSB beams with a first set of random access channel (RACH) occasion density, wherein the RACH occasion density identifies time and frequency resources that one or more user equipments (UEs) can utilize to transmit initial access requests to a base station;
configure a second set of SSB beams from the plurality of SSB beams with a second set of RACH occasion density, wherein the first set of RACH occasion density is greater than the second set of RACH occasion density for the second set of SSB beams; and
transmit a system information message to the one or more UEs that includes a beam-specific bit-field indicate the first set of RACH occasion density for the first set of SSB beams and the second set of RACH occasion density for the second set of SSB beams.

8. The apparatus of claim 7, wherein the instructions are further executable by the one or more processors, individually or in combination, configured to cause the apparatus to:
receive a physical random access channel (PRACH) preamble message from at least one UE over time and frequency resources selected from the first set of RACH occasion density for the first set of SSB beams or the second set of RACH occasion density for the second set of SSB beams;
identify a SSB beam that the UE utilized for transmission of the PRACH preamble message based on the time and frequency resources over which the PRACH preamble is received; and
establish communication with the UE over the SSB beam.

9. The apparatus of claim 7, wherein the system information message further includes information related to format of a physical random access channel (PRACH) preamble message that the one or more UEs are to utilize for initial access with the base station.

10. The apparatus of claim 9, wherein the one or more UEs that utilize resources from the first set of RACH occasion density associated with the first set of SSB beams are configured to utilize a shorter format of PRACH preamble message than the one or more UEs that utilize resources from the second set of RACH occasion density associated with the second set of SSB beams.

11. The apparatus of claim 9, wherein the one or more UEs that utilize resources from the first set of RACH occasion density associated with the first set of SSB beams are configured to transmit the PRACH preamble message repeatedly over a plurality of RACH occasions.

12. The apparatus of claim 7, wherein the system information message is a remaining minimum system information (RMSI).

13. A method for wireless communications, comprising:
receiving, at a user equipment (UE) a system information message that includes a beam-specific bit-field to indicate a random access channel (RACH) occasion density of one or subset of synchronization signal block (SSB) beams from a plurality of SSB beams;
determining, in response to receiving the system information message, that a first set of SSB beams from a plurality of SSB beams are configured with a first set of RACH occasion density and a second set of SSB beams from the plurality of SSB beams are configured with a second set of RACH occasion density, wherein the first set of RACH occasion density is greater than the second set of RACH occasion density for the second set of SSB beams;
selecting at least one RACH occasion within the first set of SSB beams or the second set of SSB beams; and
transmitting, from the UE to a base station, an initial access message on time and frequency resources corresponding to the at least one RACH occasion.

14. The method of claim 13, wherein the system information message further includes information related to format of a physical random access channel (PRACH) preamble message that the UE utilizes for initial access with the base station.

15. The method of claim 14, wherein transmitting the initial access message on the time and frequency resources corresponding to the at least one RACH occasion, comprises:
   determining that the UE will transmit on resources from the first set of RACH occasion density associated with the first set of SSB beams; and
   generating the PRACH preamble message whose format is shorter than if the UE were to select the at least one RACH occasion from the second set of RACH occasion density associated with the second set of SSB beams.

16. The method of claim 14, wherein transmitting the initial access message on the time and frequency resources corresponding to the at least one RACH occasion, comprises:
   transmitting the PRACH preamble message repeatedly over a plurality of RACH occasions from the first set of RACH occasion density associated with the first set of SSB beams.

17. The method of claim 13, wherein the system information message is a remaining minimum system information (RMSI).

18. An apparatus for wireless communications, comprising:
   one or more processors;
   and one or more memories coupled to the one or more processors, the one or more memories, individually or in combination, including instructions executable by the one or more processors, individually or in combination, configured to cause the apparatus to:
      receive a system information message that includes a beam-specific bit-field to indicate a random access channel (RACH) occasion density of one or subset of synchronization signal block (SSB) beams from a plurality of SSB beams;
      determine, in response to receiving the system information message, that a first set of SSB beams from a plurality of SSB beams are configured with a first set of RACH occasion density and a second set of SSB beams from the plurality of SSB beams are configured with a second set of RACH occasion density, wherein the first set of RACH occasion density is greater than the second set of RACH occasion density for the second set of SSB beams;
      select at least one RACH occasion within the first set of SSB beams or the second set of SSB beams; and
      transmit, from a user equipment (UE) to a base station, an initial access message on time and frequency resources corresponding to the at least one RACH occasion.

19. The apparatus of claim 18, wherein the system information message further includes information related to format of a physical random access channel (PRACH) preamble message that the UE utilizes for initial access with the base station.

20. The apparatus of claim 18, wherein the instructions to transmit the initial access message on the time and frequency resources corresponding to the at least one RACH occasion are further executable by the one or more processors, individually or in combination, to:
   determine that the UE will transmit on resources from the first set of RACH occasion density associated with the first set of SSB beams; and
   generate the PRACH preamble message whose format is shorter than if the UE were to select the at least one RACH occasion from the second set of RACH occasion density associated with the second set of SSB beams.

* * * * *